(12) United States Patent
Barfuss et al.

(10) Patent No.: US 8,908,950 B2
(45) Date of Patent: Dec. 9, 2014

(54) METHOD FOR ASCERTAINING THE THREE-DIMENSIONAL VOLUME DATA, AND IMAGING APPARATUS

(75) Inventors: Helmut Barfuss, Erlangen (DE); Karl Barth, Höchstadt (DE); Clemens Bulitta, Spardorf (DE); Rainer Graumann, Höchstadt (DE); Christian Schmidgunst, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 192 days.

(21) Appl. No.: 13/638,837

(22) PCT Filed: Mar. 16, 2011

(86) PCT No.: PCT/EP2011/053920
§ 371 (c)(1),
(2), (4) Date: Dec. 10, 2012

(87) PCT Pub. No.: WO2011/120795
PCT Pub. Date: Oct. 6, 2011

(65) Prior Publication Data
US 2013/0202171 A1    Aug. 8, 2013

(30) Foreign Application Priority Data
Mar. 31, 2010  (DE) .......................... 10 2010 013 498

(51) Int. Cl.
*G06K 9/00* (2006.01)
*G06T 7/00* (2006.01)
*G06T 11/00* (2006.01)

(52) U.S. Cl.
CPC ............ *G06T 7/0065* (2013.01); *G06T 11/006* (2013.01); *G06T 2211/412* (2013.01); *G06T 2211/436* (2013.01)
USPC ........................................................ 382/131

(58) Field of Classification Search
USPC ............ 250/363.04; 345/419, 424; 378/4, 21, 378/25, 26, 27; 382/131, 132; 600/456
See application file for complete search history.

(56) References Cited

U.S. PATENT DOCUMENTS 4,859,852 A * 8/1989 Genna et al. ............... 250/363.1
5,760,781 A * 6/1998 Kaufman et al. ............. 345/424
(Continued)

FOREIGN PATENT DOCUMENTS

| DE | 198 58 306 A1 | 7/1999 |
|---|---|---|
| DE | 102 06 190 A1 | 9/2003 |

(Continued)

OTHER PUBLICATIONS

Ritter, D., et al., "3D soft tissue imaging with a mobile C-arm", Computerized Medical Imaging and Graphics, 2006, pp. 91-102, vol. 31, No. 2, Elsevier/Science Direct.

(Continued)

*Primary Examiner* — Gregory F Cunningham
(74) *Attorney, Agent, or Firm* — Laurence A. Greenberg; Werner H. stemer; Ralph E. Locher

(57) ABSTRACT

An imaging apparatus has a capture device for capturing 1D or 2D image data. A position and/or orientation for a moving section of an examination object is captured, for example using a measuring device, for a plurality of capture times for the image data. A computation device reconstructs 3D volume data from the image data based on projection parameters and based on the position and/or orientation of the moving section of the examination object.

21 Claims, 5 Drawing Sheets

(56) References Cited

U.S. PATENT DOCUMENTS

| | | | |
|---|---|---|---|
| 5,963,612 A | 10/1999 | Navab | |
| 5,963,613 A | 10/1999 | Navab | |
| 6,044,132 A | 3/2000 | Navab | |
| 6,049,582 A | 4/2000 | Navab | |
| 6,320,928 B1* | 11/2001 | Vaillant et al. | 378/4 |
| 6,731,283 B1 | 5/2004 | Navab | |
| 6,771,734 B2 | 8/2004 | Hebecker et al. | |
| 6,990,228 B1* | 1/2006 | Wiles et al. | 382/154 |
| 7,315,605 B2 | 1/2008 | Boese et al. | |
| 7,630,751 B2 | 12/2009 | Boese et al. | |
| 2003/0152195 A1 | 8/2003 | Hebecker et al. | |
| 2003/0210407 A1* | 11/2003 | Xu | 356/611 |
| 2005/0203373 A1 | 9/2005 | Boese et al. | |
| 2006/0285632 A1 | 12/2006 | Boese et al. | |
| 2008/0312866 A1* | 12/2008 | Shimomura et al. | 702/155 |
| 2010/0272342 A1* | 10/2010 | Berman et al. | 382/131 |
| 2011/0235885 A1* | 9/2011 | Rauch et al. | 382/131 |

FOREIGN PATENT DOCUMENTS

| | | |
|---|---|---|
| DE | 10 2004 004 603 A1 | 8/2005 |
| DE | 10 2005 027 963 B3 | 12/2006 |

OTHER PUBLICATIONS

Galigekere, et al., "Cone-Beam Reprojection Using Projection-Matrices", IEEE Transactions on Medical Imaging, 2003, pp. 1202-1214, vol. 22, No. 10.

Wiesent, K., et al., "Enhanced 3-D-Reconstruction Algorithm for C-Arm Systems Suitable for Interventional Procedures", IEEE Transactions on Medical Imaging, May 2000, pp. 391-403 vol. 19, No. 5.

* cited by examiner

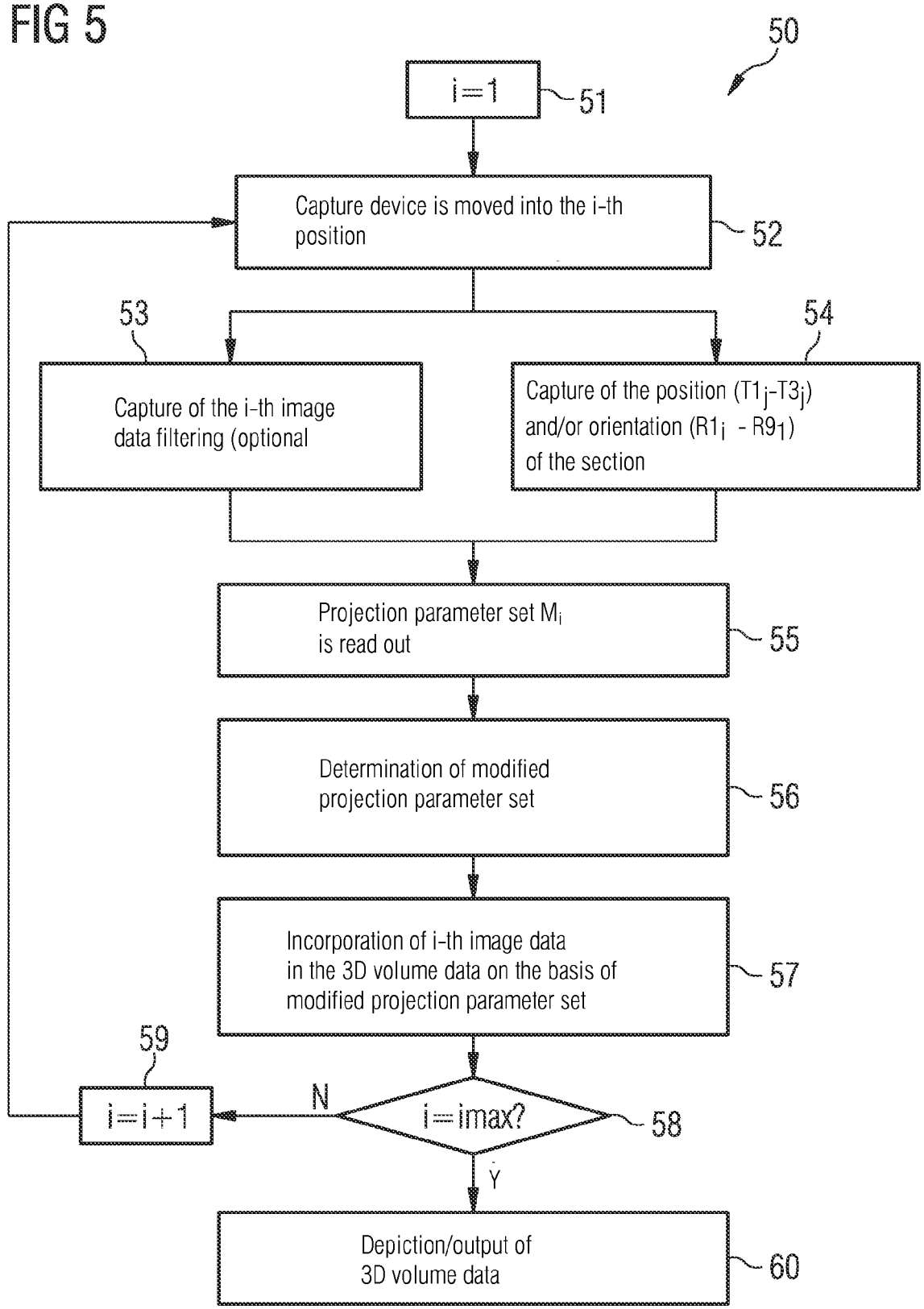

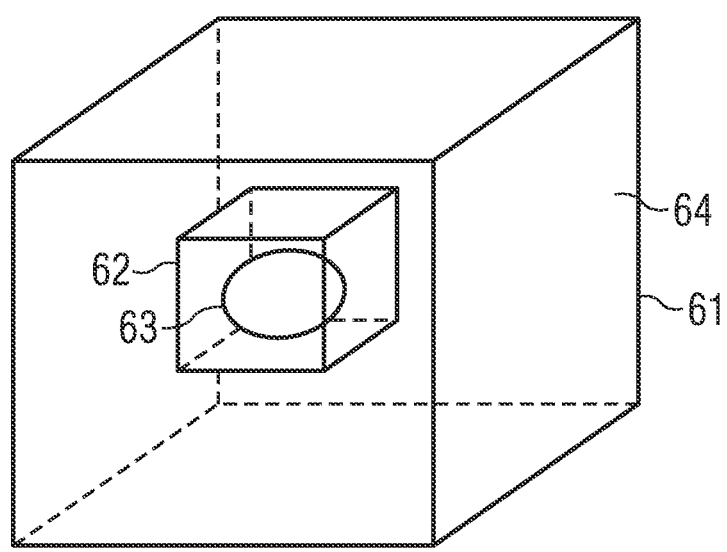

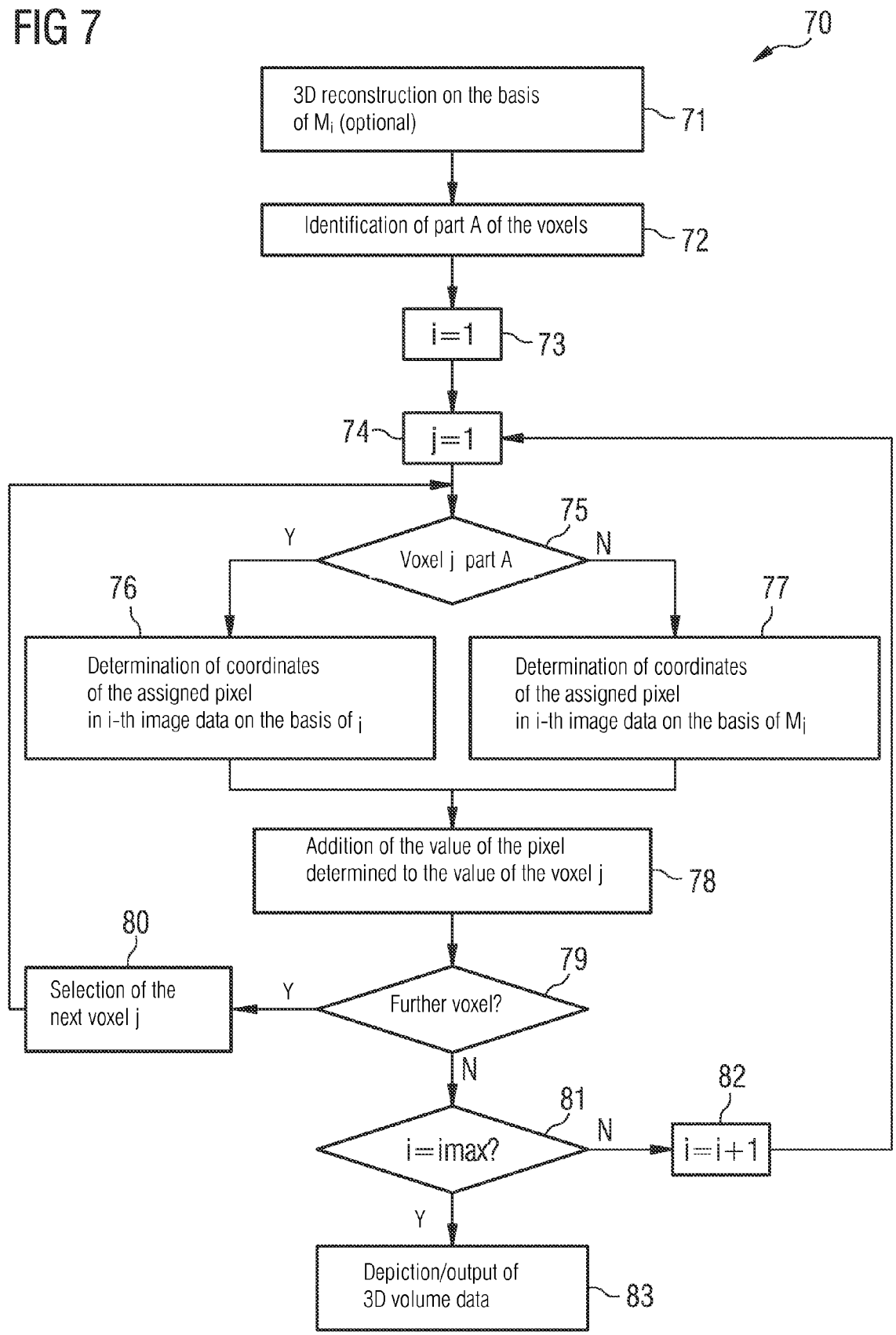

METHOD FOR ASCERTAINING THE THREE-DIMENSIONAL VOLUME DATA, AND IMAGING APPARATUS

BACKGROUND OF THE INVENTION

Field of the Invention

The invention relates to a method for determining 3D volume data and an imaging apparatus. The invention in particular relates to a method of this kind and an apparatus of this kind with which the three-dimensional (3D) volume data is reconstructed from a plurality of sets of 1D image data or 2D image data.

Methods and apparatuses of this kind are used, for example, for medical imaging. In recent decades, three-dimensional imaging has become an important tool for medical applications. Three-dimensional imaging performed before or during treatment can facilitate the performance of therapy. For example, during treatment with a surgical instrument, for example an endoscope or an arthroscope with an imaging modality, such as 3D X-ray, 3D computed tomography (CT), magnetic resonance or ultrasound, 3D volume data are obtained in order to determine the position and orientation of a cutting or resecting instrument relative to an organ or vessel during a therapy session.

For the generation of 3D data sets, frequently a plurality of sets of 1D image data are captured by a detector row or a plurality of sets of 2D image data captured with a planar detector. 3D volume data of the examination object are reconstructed from the sets of image data. The plurality of sets of image data is typically captured in a time-sequential way, wherein the detectors and/or source of the radiation, for example an X-ray source, are moved in space. Examples of data capture of this kind include so-called C-arm systems with which the X-ray source and a planar detector arrangement are moved about the examination object along a circular arc. Other examples include systems provided with more complex trajectories of the detector arrangement and/or the X-ray source, for example spiral trajectories. Frequently tens, for example between 40 and 1000, sets of 2D image data are captured from which 3D volume data are reconstructed. Different methods of reconstruction are known from the prior art. Examples include so-called filtered back projection (FBP) and iterative or algebraic reconstruction techniques (ART). With these methods, 3D reconstruction of the examination object is performed on the basis of knowledge of which pixel in a set of 2D image data depicts a given volume element or voxel. In numerous imaging methods, for example 3D X-ray methods, imaging conditions of this kind can be described effectively by projection matrices. The projection matrices can be used to determine how the coordinates of each voxel in the volume are expressed in 2D image coordinates. The projection matrices can be determined by calibration or computation and firmly implemented in the imaging apparatus. Details of the reconstruction of 3D volume data are, for example, described in DE 198 58 306 A1.

With the above-described method for 3D reconstruction, the reconstruction is performed from a plurality of sets of image data captured in a time-sequential way. If the examination object or a section of the examination object moves in a laboratory system between the capture times at which the different sets of image data are captured, this can result in artifacts or blurring in the reconstructed 3D volume data. Such movements of sections of the examination object can occur, for example, when images are taken of soft-tissue in the chest or abdominal cavity. A movement of a section of the examination object, for example an organ, can be caused by respiratory displacement, heart movements, peristaltic motions or the displacement of the section by a surgical or diagnostic instrument.

DE 10 2004 004 603 A1 describes a method and an imaging device for the compensation of patient movements. In this case, a comparison of 2D image data with 3D reconstruction is used to capture patient movements and ratios of the imaging system are influenced on the basis of the patient movements. This enables the generation of sets of image data with which the position of the patient relative to the imaging system corresponds at least approximately to prespecified relative positions and artifacts are correspondingly reduced.

A further approach for motion compensation can be based on a prediction of movements, for example by the extrapolation of data that has already been captured. In many cases, for example on the displacement of an organ by a diagnostic or surgical instrument, a predictive statement of this can be difficult or impossible to obtain.

A further approach to motion compensation can be based on the motion-dependent manipulation of the captured 1D or 2D image data. For example, the captured image data can be subjected to transformation, for example translation or rotation, before 3D volume data is reconstructed from the transformed image data. However, the determination of the correct transformations to which the image data are initially subjected can be a challenge.

BRIEF SUMMARY OF THE INVENTION

The invention is based on the object of disclosing an improved method and improved apparatus with which artifacts in reconstructed 3D volume data can be reduced. In particular, the invention is based on the object of disclosing a method and an apparatus which permits or permit reliable reconstruction of the 3D volume data even when there is no a priori knowledge of the movement of the examination object or of a section of the examination object.

According to the invention, a method, a computer program and an imaging apparatus are disclosed as defined in the independent claims. The dependent claims define preferred or advantageous embodiments of the invention.

In one method according to the invention for determining 3D volume data of an examination object, 3D volume data are reconstructed from a plurality of sets of 1D or 2D image data on the basis of a plurality of projection parameter sets. Each projection parameter set is assigned to a set of image data and indicates the pixel coordinates of the set of image data in which voxel coordinates of voxels of a measuring chamber are depicted. For at least one moving section of the examination object, positional data are determined which indicate for a plurality of capture times for the image data a position and/or an orientation of the at least one section of the examination object. The 3D volume data from the plurality of sets of image data is reconstructed on the basis of both the plurality of projection parameter sets and the positional data.

With the method, in addition to the projection parameter sets, the reconstruction is also based on the positional data determined. This enables a change in the position and/or orientation of the at least one section of the examination object to be taken into account in the reconstruction. This enables the reduction of blurring or artifacts caused by the movement of the at least one section of the examination object in the reconstructed 3D volume data.

The moving section of the examination object can, for example, be an organ whose position and/or orientation changes due to respiratory motions, heart beats, manipulation by a diagnostic or surgical device or the like. The section can also be the entire examination object. A change to the whole examination object in the measuring chamber can, for example, be caused by a deliberate or inadvertent movement of a patient table.

If the section of the examination object undergoes a spatial expansion, a change to the position will be understood as a change to the spatial coordinates of a prespecified point, for example of the volume centroid, of the section. A change to the orientation is understood to mean a rotation of the directional vector from a first point of the section to a second point of the section, which have a substantially constant distance from each other during the movement of the section.

In the method, the sets of image data from which the 3D volume data are reconstructed can remain unchanged. The movement of the at least one section of the examination object can be taken into account by using the positional data in the actual reconstruction process.

In the method, a plurality of modified projection parameter sets can be determined on the basis of the plurality of projection parameter sets and the positional data. The 3D volume data is then reconstructed on the basis of the modified projection parameter sets. This enables the positional data to be determined simply in existing reconstruction algorithms. The reconstruction can be performed on the basis of the modified projection parameter sets generated on the basis of the positional data, wherein it is possible to use known reconstruction methods. For example, the reconstruction can be performed by means of filtered back projection (FBP), for example with a Shepp-Logan filter, or with another reconstruction method, for example iterative or algebraic reconstruction.

In the method, the modified projection parameter sets can be generated such that, for at least one set of image data, in particular for each set of image data, the modified projection parameter set indicates the pixel coordinates of the set of image data in which the voxels of the at least one section of the examination object are depicted. While the non-modified projection parameter sets indicate the depiction of voxel coordinates of a fixed voxel in the measuring chamber in pixel coordinates of the image data, the projection parameter sets modified in this way take into account the displacement and/or rotation of the at least one section of the examination object relative to a reference position at the time of the respective data capture.

In the method, for at least one set of image data, in particular for each set of image data, the projection parameters can represent matrix elements of a projection matrix. To determine the modified projection parameter set assigned to the set of image data, matrix elements of a matrix product of the projection matrix and a further matrix defining a displacement and/or rotation of the at least one section of the examination object relative to a reference position of the at least one section, can be determined. The modified projection parameter sets determined in this way take into account the displacement and/or rotation of the at least one section of the examination object relative to the reference position at the time of the respective data capture. This reduces blurring or artifacts in the 3D reconstruction. The modified projection parameter sets can be used in conventional reconstruction algorithms.

If the projection parameters assigned to a set i of image data are elements of a projection matrix Mi, the modified projection parameters for the set i of image data can be determined as matrix elements of $$\tilde{M}_i = M_i \cdot K_i. \tag{1}$$

Here, $K_i$ is the further matrix defining a displacement and/or rotation of the at least one section of the examination object relative to the reference position of the at least one section. The further matrix $K_i$ can be defined such that the product of $K_i$ with the position vector of a point of the section in the reference position of the examination object is the same as the position vector of this point at the time of the data capture for the set i of image data. When homogeneous coordinates are used, $K_i$ can be displayed as a 4×4 matrix. In homogeneous coordinates, the $K_i$ matrix can take the following form $$K_i = \begin{pmatrix} R1_i & R2_i & R3_i & T1_i \\ R4_i & R5_i & R6_i & T2_i \\ R7_i & R8_i & R9_i & T3_i \\ 0 & 0 & 0 & 1 \end{pmatrix} \tag{2}$$

Rotation or displacement of the section of the examination object can be taken into account in the matrix elements $R1_i$-$R9_i$ and $T1_i$-$T3_i$. In addition, it is also possible to take into account deformation, for example shearing or contractions or expansions corresponding to scaling along the spatial directions with the further matrix $K_i$.

In the method, all voxels of the 3D volume data are reconstructed on the basis of the modified projection parameter sets determined. If only a part of the examination object moves, the moved section is then reconstructed with a higher definition than the other sections of the examination object. This can in particular be advantageous if the moved section is the part of the examination object which is essential for the imaging, for example an organ to be depicted three-dimensionally. In addition, if the entire examination object in a laboratory system is moved, a reconstruction of all voxels on the basis of the modified projection parameter sets can be advantageous.

Alternatively, in the method, it is also possible for only a part of the voxels of the 3D volume data to be reconstructed on the basis of the modified projection parameter sets determined. This enables the reconstruction to be performed differently for moved and non-moved sections of the examination object and blurring to be avoided during the reconstruction of non-moved sections of the examination object.

The part of the voxels which is reconstructed on the basis of the modified projection parameter sets can be determined on the basis of at least one position of the section of the examination object. The part of the voxels can, for example, be selected such that, in the case of a reconstruction of the 3D volume data on the basis of the non-modified projection parameter sets, the moving section of the examination object is arranged in the partial volume which is reconstructed on the basis of the modified projection parameter sets. A geometric body, for example a cuboid or an ellipsoid, can define the part of the voxels of the 3D volume data which is reconstructed on the basis of the modified projection parameter sets. This enables motion blurring to be selectively reduced in the region of the 3D volume data in which motion blurring would normally occur.

In the method, a first reconstruction of the 3D volume data can be performed on the basis of the plurality of projection parameter sets and independently of the positional data. The 3D volume data determined in this case can be used as the basis for the determination of the part of the voxels for which the reconstruction is then performed on the basis of the modified projection parameter sets. In one embodiment, object segmentation can be performed in the initially reconstructed 3D volume data in order to determine the part of the voxels for which the reconstruction is then performed on the basis of the modified projection parameter sets. The first 3D reconstruction provides a reliable estimation of the region of the 3D volume data in which motion blurring is to be reduced.

A further part of the voxels of the 3D volume data can be reconstructed on the basis of the plurality of projection parameter sets and independently of the positional data. In particular for unmoved sections of the examination object, the reconstruction can be performed on the basis of the non-modified projection parameter sets.

A measuring device is able to capture the positional data during image data capture. The measuring device can be provided separately from a capture device for capturing the image data. This enables the measuring device to determine the positional data independently of the capture of the image data.

The measuring device can capture the positional data using waves, in particular electromagnetic, optical or acoustic waves. For example, the measuring device can comprise an ultrasound device to monitor the position of an organ. The measuring device can, for example, comprise one or more transmitters and/or one or more microsensors for electromagnetic fields with which the position and/or orientation of the section of the examination object is captured. The measuring device can also comprise one or more cameras with which the position of an externally visible element attached to the examination object is monitored.

The measuring device can capture a position of at least one anatomical marker on the at least one section of the examination object as a function of time in order to determine the positional data. Examples of anatomical markers of this kind are vascular bifurcations.

Alternatively or additionally, the measuring device can capture a position of at least one non-anatomical element in or on the section of the examination object as a function of time in order to determine the positional data. Examples of non-anatomical elements of this kind include elements which can be placed non-invasively on the section of the examination object. These include, for example, microsensors and probes which can be swallowed by a patient.

Further examples of non-anatomical elements of this kind include implants, stents or clips present in a patient's body. Further examples of non-anatomical elements whose position can be monitored by the measuring device, include microsensors or microtransmitters provided on the section of the examination object. The introduction of the non-anatomical element into the body is not a step of the method according to the embodiments of the invention.

Further examples of non-anatomical elements of this kind include sensors or transmitters attached to a surgical or diagnostic device, for example a catheter or endoscope. The introduction of the surgical or diagnostic device into the body is not a step of the method according to the embodiments of the invention.

In the method, the positional data can also be determined computationally on the basis of the image data. For example, a plurality of subgroups can form the plurality of sets of image data which are evaluated in order to determine the position and/or orientation of the section of the examination object for a plurality of times. The positional change of a marker, for example an anatomical marker or stent, clip or implant, can be tracked using the signature in the sets of image data. One or more first 3D reconstructions performed on the basis of the projection parameter sets independently of positional data can be used to determine the positional data. This permits an improvement to the 3D reconstruction subsequently performed on the basis of the positional data without it being necessary to provide a separate measuring device for determining the positional data.

The examination object can be moved in a laboratory system between the capture of at least two sets of image data. This permits greater flexibility with the data capture. The displacement in the sets of image data resulting from the displacement of the entire examination object can be at least partially compensated by the 3D reconstruction on the basis of the positional data.

A capture device for capturing the plurality of sets of image data can be moved in the laboratory system between a plurality of positions. The examination object can be moved on the basis of the position of the capture device in the laboratory system. Selective movement of the examination object enables the capture of the image data to take place such that, compared to a still examination object, a larger number of pixels of the image data capture beams that propagate through the examination object. If, for a first position of the capture device, a measurement of the patient in a direction perpendicular to a beam direction or perpendicular to a middle beam of a cone beam has a first value and, for a second position of the capture device, a measurement of the patient in a direction perpendicular to a beam direction or perpendicular to a middle beam of a cone beam has a second value smaller than the first value, the examination object can be moved such that it has a greater distance from a radiation source for the first position of the capture device than for the second position of the capture device. This enables the number of pixels of the image data that can be used for the 3D reconstruction to be increased. The image data can be captured by an X-ray planar detector. This enables motion blurring with 3D X-ray imaging to be reduced.

According to a further aspect of the invention, a computer program is disclosed comprising a sequence of commands, which, when executed by an electronic computation device of an imaging apparatus, causes the imaging apparatus to perform the method according to an aspect or exemplary embodiment of the invention. The computer program can, for example, be loaded in the memory of an evaluation computer of an imaging apparatus, for example a C-arm system. The computer program can be in the form of a source code or a compiled sequence of commands. The computer program enables the imaging apparatus to be programmed to perform the method.

According to a further aspect of the invention, a data carrier is disclosed on which a computer program comprising a sequence of commands is stored, which, when executed by a processor of an imaging apparatus, causes the imaging apparatus to perform the method according to an aspect or exemplary embodiment of the invention. The data carrier can, for example, be a CD-ROM, a DVD, a magnetic tape, a flash memory or a USB stick on which the computer program is stored as electronically readable control information. When this control information is read by the data carrier and executed by a computation device of an imaging apparatus, the method can be performed automatically in accordance with the different aspects or embodiments of the imaging apparatus.

According to a further aspect of the invention, an imaging apparatus is disclosed comprising a capture device for capturing a plurality of sets of 1D or 2D image data of an examination object and a memory unit for storing a plurality of projection parameter sets. Each projection parameter set is assigned to a set of image data and indicates the pixel coordinates of the set of image data in which voxel coordinates of voxels of a measuring chamber are depicted. The imaging apparatus also comprises a computation device which is coupled to the capture device and the memory unit and set up in order to reconstruct 3D volume data from the plurality of sets of image data on the basis of the plurality of projection parameter sets. The computation device is also set up in order to perform the reconstruction of the 3D volume data on the basis of positional data, which indicate a position and/or an orientation of at least one moving section of the examination object for a plurality of capture times for the image data.

Since the reconstruction can also be performed on the basis of the positional data as well as the projection parameter sets, a change in the position and/or orientation of the at least one section of the examination object can be taken into account in the reconstruction. This enables blurring or artifacts caused by the movement of the at least one section of the examination object to be reduced in the reconstructed 3D volume data.

The computation device can be set up in order to determine a plurality of modified projection parameter sets on the basis of the plurality of projection parameter sets and the positional data and to reconstruct the 3D volume data from the sets of image data on the basis of the modified projection parameter sets. This enables the positional data to be integrated in existing reconstruction algorithms.

The computation device can be set up in order to generate the modified projection parameter sets in such a way, that for at least one set of image data, in particular for each set of image data, the modified projection parameter set indicates the pixel coordinates of the set of image data in which voxels of the at least one section of the examination object are depicted. The projection parameter sets modified in this way take into account the displacement and/or rotation of the at least one section of the examination object relative to a reference position at the time of the respective data capture.

The computation device can be set up in order, for at least one set of image data, in particular for each set of image data, for the determination of the modified projection parameter set, to determine matrix elements of a matrix product of a projection matrix and a further matrix, which defines a displacement and/or rotation of the at least one section of the examination object relative to a reference position of the at least one section.

The imaging apparatus can comprise a different measuring device from the capture device, which is set up in order to determine the positional data. The measuring device can, for example, have the different variants described with reference to embodiments of the method.

The imaging apparatus can have a planar X-ray detector for capturing the image data.

The imaging apparatus can be set up to perform the method according to one of the aspects or one of the embodiments of the invention.

The invention is suitable for 3D imaging on examination objects with moving sections, in particular for medical imaging, without being restricted to these applications.

The following explains exemplary embodiments of the invention with reference to the drawing.

BRIEF DESCRIPTION OF THE SEVERAL VIEWS OF THE DRAWING

FIG. 5 is a flow diagram of a method according to an exemplary embodiment.

FIG. 6 is a schematic representation of reconstructed 3D volume data to explain an exemplary embodiment.

FIG. 7 is a flow diagram of a method according to a further exemplary embodiment.

DESCRIPTION OF THE INVENTION

The features of the exemplary embodiments described in the following can be combined with each other unless it is expressly stated otherwise.

The following describes exemplary embodiments of the invention in the context of a 3D X-ray imaging. However, the methods and apparatuses according to exemplary embodiments of the invention can also be applied in other fields in which 3D volume data is reconstructed from a plurality of sets of 1D image data or 2D image data. While the imaging apparatuses according to exemplary embodiments are set up in order to determine 3D volume data suitable for a graphical representation, the term 'imaging apparatus' does not imply that there has to be an graphical output.

Figure 1:
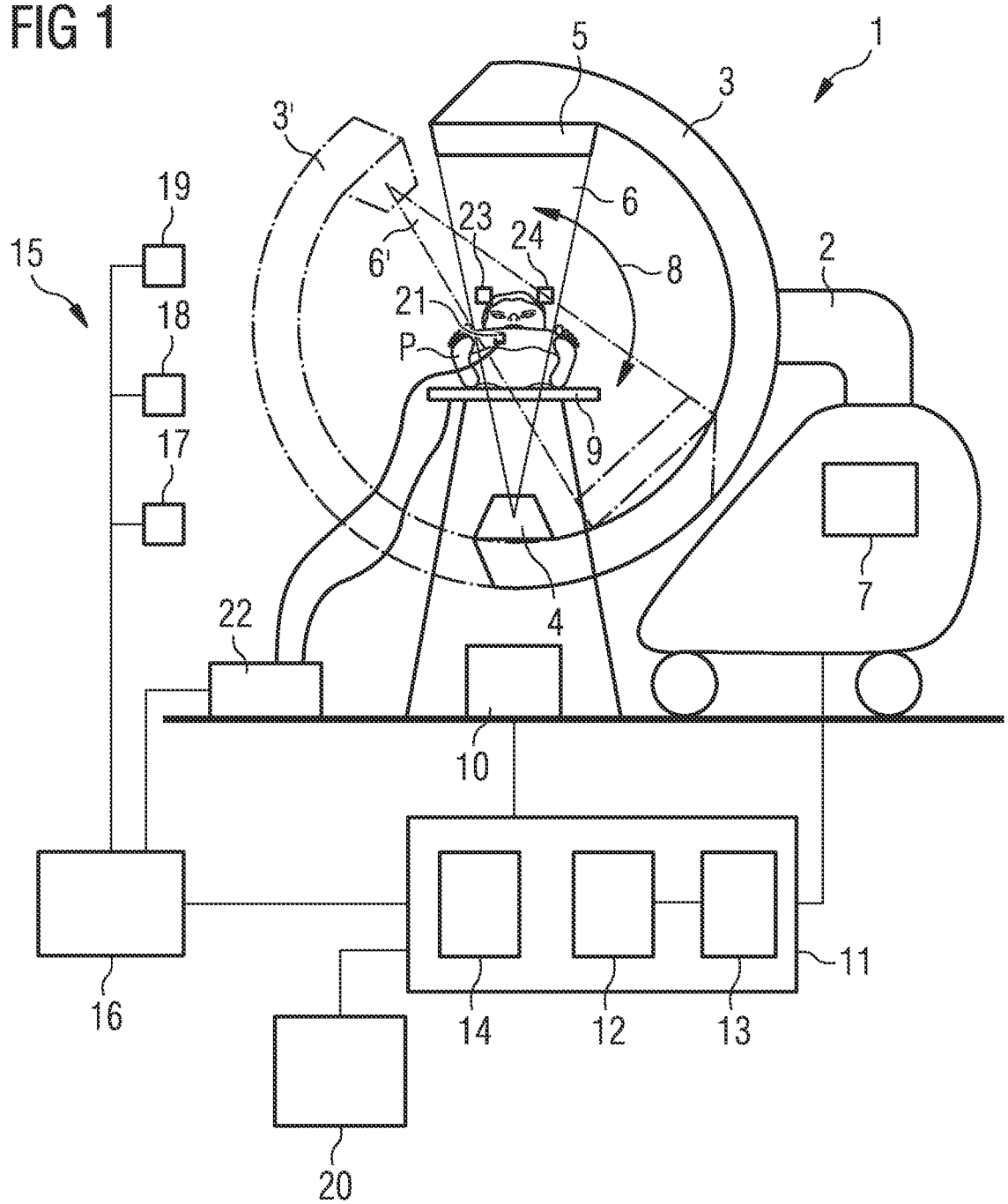
FIG. 1 is a schematic representation of an imaging apparatus according to an exemplary embodiment.

FIG. 1 is a schematic representation of an imaging apparatus 1 according to one exemplary embodiment. The imaging apparatus 1 comprises a C-arm device 2, an evaluation and control unit 11 and a measuring device 15. The C-arm device 2 has a C-arm 3, which is mounted pivotably about at least one axis and to which an X-ray tube 4 and a detector 5 disposed opposite the X-ray tube is secured. The X-ray tube 4 emits X-radiation, which penetrates a volume defined, for example, by a cone beam 6, and is captured by the detector 5. The detector 5 can comprise one or advantageously a plurality of detector rows. The detector 5 can in particular be a planar detector. Examples of detectors of this kind include co-called image intensifiers—plus camera system or co-called flat-panel detectors. A drive device 7 is operatively connected to the C-arm in order to move the C-arm 3 between a plurality of positions. The movement of the C-arm 3 is shown at 8. The C-arm is shown in another position with broken lines at 3'. The movement of the C-arm 3 results in a corresponding change in the volume 6' penetrated by the X-radiation. A patient table 9 supports an examination object P, for example a patient. The patient table 9 can be moved in at least one translation degree of freedom, advantageously in all three (height, width, length). A drive device 10 is operatively connected to the patient table 9 in order to drive said table.

The evaluation and control unit 11 is connected to the C-arm device 2 and comprises a control unit 14 to control the drive device 7 for moving the C-arm 3 and to control of the drive device 10 for moving the patient table 9. Although, to elucidate the function, the evaluation and control unit 11 is shown as a separate element, the evaluation and control unit 11 can be installed in the housing of the C-arm device 2. A memory 13 stores a plurality of projection parameter sets. Each of the projection parameter sets is assigned to exactly one position of the C-arm 3. The parameters of a projection parameter set specify in each case the pixel coordinates of the detector 5 in which voxels with specified voxel coordinates in the measuring chamber penetrated by the beams 6 are depicted for the respective position of the C-arm 3. The projection geometry can frequently be well described by the matrix elements of a projection matrix as will be explained in more detail below. An electronic computation device 12 reconstructs 3D volume data from the image data captured by the detector 5 on the basis of the projection parameter sets in the plurality of positions. For example, the control unit 14, the drive device 7 and the X-ray source 4 ensure that, for example, image data is captured in 40 to 1000 positions of the C-arm 3. A reconstruction of the 3D volume data is performed from the totality of the sets of image data captured in this way. The memory 13 can also store instruction codes, which are read and executed by the control unit 14 and the computation device 12 in order to cause the imaging apparatus 1 to perform the method according to one of the exemplary embodiments of the invention.

The measuring device 15 captures positional data, which indicates the position and/or orientation of at least one section of the examination object P for a plurality of times. The at least one section can also be the entire examination object P whose movement in space can be captured. The measuring device 15 can have different variants. The measuring device 15 can, for example, be set up to determine the position of one or more points of the section of the examination object using electromagnetic fields or optical radiation. To this end, the measuring device 15 can have one or more devices 17-19 which are connected to a computer 16 and are set up in order to generate electromagnetic fields and/or generate electromagnetic signals. The computer 16 can, for example, determine the position and/or orientation of the section of the examination object on the basis of electromagnetic radiation field strengths or running times captured by the devices 17-19. In one variant, the measuring device is designed such that a magnetic field surrounding the examination object P is established. In the magnetic field, microsensors can be located by field strength measurements.

Shown by way of example is a microsensor 21 in an abdominal region of the examination object P and a pair of spaced-apart microsensors 23, 24 on the head of the examination object. The microsensor 21 can send captured field strengths to the computer 16 via an interface 22. The computer can determine the position of the microsensor 21 from the field strengths. Similarly, the pair of microsensors 23, 24 can forward captured field strengths to the computer 16. This enables the positions of the microsensors 23, 24 in the laboratory system to be determined. Since the head can be considered to be a rigid body, the computer 16 is able to determine displacement and rotation of the head relative to a reference position from the positions of the microsensors 23, 24. Further variants of the measuring device are possible. For example, the measuring device can determine the position(s) of one or more elements introduced non-invasively into the body of the patient for a plurality of capture times. The measuring device can also determine the position(s) of one or more elements introduced invasively into the body of the patient, for example a microsensor or transmitter placed on an organ by means of a catheter or an endoscope, for a plurality of capture times. The steps required to introduce the element are not part of the described and claimed method for the reconstruction of 3D volume data.

The measuring device 15 captures the position and/or orientation of at least one section of the examination object P for a plurality of times such that assignment of the respective captured position and/or orientation of the section to the different sets of image data is possible. For example, the measuring device 15 can capture the position and/or orientation of the section of the examination object at least at the times $t_i$ at which the detector 5 captures the i-th set of image data. Alternatively, the measuring device 15 can capture the position and/or orientation of the section of the examination object continuously or quasi-continuously. The position and/or orientation of the section of the examination object at the capture times for the image data can be extracted from this data.

The computation device 12 reconstructs 3D volume data on the basis of both the projection parameter sets stored in the memory 13 and the positional data representing the position and/or orientation of the section. To this end, the computation device 12 determines a modified projection parameter set for the sets of image data on the basis of projection parameter set assigned to one set of image data and at least the positional data indicating a position and/or orientation of the section on the capture of the set of image data. The computation device then performs the reconstruction of the 3D volume data from the image data on the basis of the modified projection parameter sets without the image data, from which the 3D volume data are reconstructed having to be subjected to motion correction before the performance of the reconstruction. The reconstructed 3D volume data can be output via an interface of the imaging apparatus 1 for further processing or displayed on a display device 20.

The mode of operation of the imaging apparatus 1 and methods performed thereby are described in more detail with reference to FIGS. 2-7.

Figure 2:
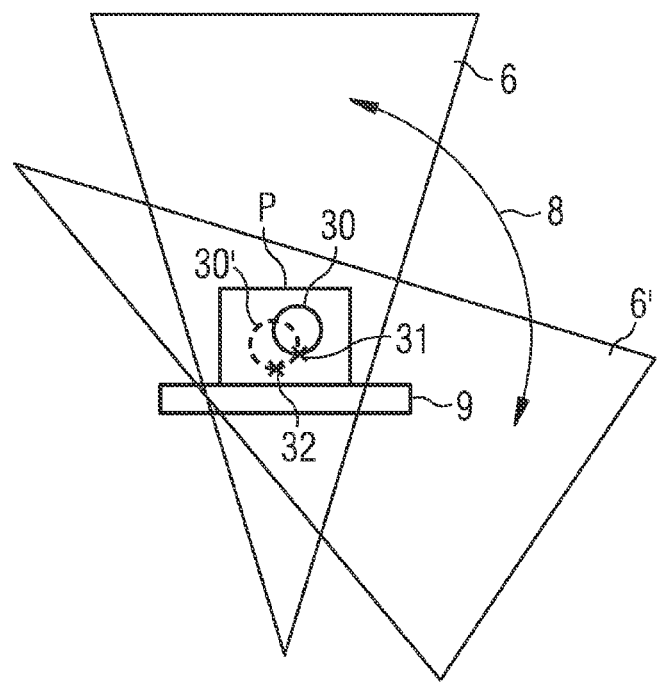
FIG. 2 is a schematic representation of a section of an examination object to explain an exemplary embodiment.

FIG. 2 is a schematic representation of a section 30 of an examination object P. The section 30 can, for example, be an organ, for example a liver, of the patient P. A movement of the section 30 causes the section 30 to adopt different positions in the laboratory system during the capture of different sets of image data. The position of the section 30 during a data capture, with which the cone beam penetrates the volume designated 6 is depicted with continuous lines. In a further data capture in which the cone beam penetrates the volume designated 6', the position of the section 30' is depicted with broken lines. Due to the movement of the section 30, a point of the section 30, which is arranged during a data capture at a position 31 in the laboratory system, with which the further data capture is located at a position 32 spaced apart therefrom in the laboratory system. A corresponding effect would also occur when the entire examination object P is moved. With a conventional reconstruction, this displacement in the laboratory system can result in blurring or artifacts in the 3D volume data. In order to reduce these, with apparatuses and method according to embodiments of the invention, the positional data representing the position and/or orientation of the section 30 for different capture times are determined. The reconstruction of the 3D volume data is performed on the basis of the positional data in order to take into account a positional change of the section 30 between the capture of different sets of image data. As will be described in more detail with reference to FIG. 5, modified projection parameter sets can be determined such that they define the pixel coordinates of a set of image data in which moving voxels of the section 30 are depicted.

Figure 3:
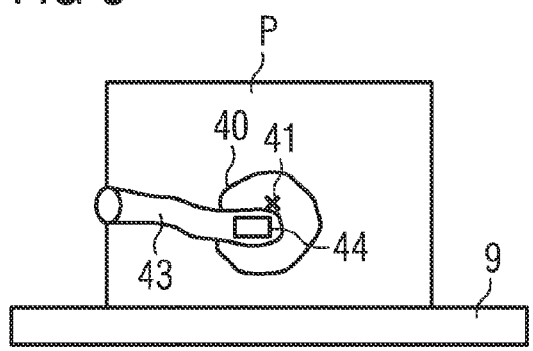
FIG. 3 is a schematic representation of a section of an examination object to explain an exemplary embodiment.
Figure 4:
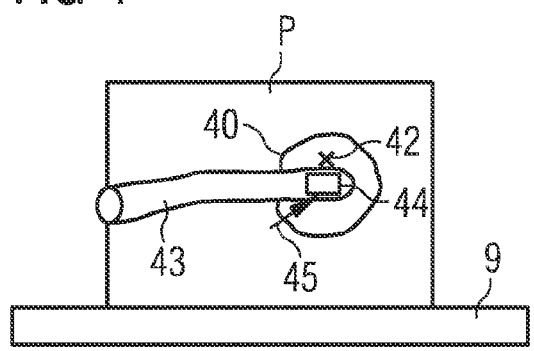
FIG. 4 is a schematic representation of the section of an examination object in FIG. 3 at a different time.

FIGS. 3 and 4 are schematic representations of a section 40 of an examination object P at different times. The section 40 can for example be an organ, for example a liver, of the patient P. Due to the movement of the section 40, a point of the section 40, which is arranged at a position 41 in the laboratory system during a data capture, is located at a position 42 spaced-apart therefrom in the laboratory system during the further data capture. In different cases, a moving section of the examination object can at least approximately be considered to be a rigid body. This applies, for example, to sections of the skeleton. It is also possible to approximate the movement of different organs, such as, for example, the liver, by a combination of translation and rotation of a rigid body. In the case of a translatory movement, the position of the section 40 relative to a reference position can be indicated by a displacement vector 45.

The displacement vector 45 can be determined by determining the position of an element 44 provided on the section 40. The element 44 can, for example, be a clip, a stent or an implant. The element 44 can also be a microsensor or a microtransmitter which is placed on the section 40 with a surgical instrument via a vessel 43. Alternatively, the element 44 can also be provided on a surgical instrument with its end placed on or in the section 40. The element 44 can be embodied such that it can be placed non-invasively on the section 40. If a surgical step is necessary for the positioning of the element 44, the surgical step is not a component of the method according to the invention.

To determine the displacement vector 45, the element 44 can, for example, be embodied as a microsensor which measures the magnetic field strengths in at least three spatial directions and outputs them to a measuring device computer, for example the computer 15 in FIG. 1. The respective position of the element 44 can be determined from the magnetic field strengths. For example, an element 44 with a coil can determine the position of the element 44 in space. An element 44 with two non-collinear coils can also be used to determine the orientation.

As mentioned, the measuring device for determining the positional data can also have a different design. For example, the measuring device can determine the position of the section 40 using ultrasonic waves. Sensors can also be attached externally to the examination object in order, for example, to determine positional changes of the head or the entire examination object.

FIG. 5 is a flow diagram of a method 50 according to an exemplary embodiment. In the method, a plurality of sets of image data, in particular 2D image data, are captured. 3D volume data are reconstructed from the sets of image data. The method 50 can be performed by the imaging apparatus 1.

At 51-56, a plurality of sets of image data is captured. The number of sets of image data is designated imax, and i designates an index for the identification of a set of image data.

At 51, the index i=1 is initialized.

At 52, the capture device is positioned in one out of a plurality of positions to capture the i-th set of image data. This can be performed by positioning an X-ray source and/or of an X-ray detector.

At 53, the i-th set of image data is captured. The set of image data can be captured with an X-ray planar detector. The image data can be filtered, for example with a Shepp-Logan filter.

At 54, in parallel to the capture of the i-th image data, a position and/or orientation of a section of the examination object is determined. The determination of the position and/or orientation can be performed in the different ways described above, for example in a wave-based way, using microsensors or microtransmitters or the like.

At 55, a projection parameter set is read out which is assigned to the captured set of image data in the i-th position of the capture device. The projection parameter set assigned to the i-th set of image data shows a depiction between voxel coordinates and pixel coordinates in the i-th set of image data. This information is used for the actual reconstruction.

The projection parameter set for the i-th set of image data can for example consist of the elements of a projection matrix $M_i$. The projection matrix can generally be derived from a 4×4-matrix with the following form $$\begin{pmatrix} r1_i & r2_i & r3_i & t1_i \\ r4_i & r5_i & r6_i & t2_i \\ r7_i & r8_i & r9_i & t3_i \\ p1_i & p2_i & p3_i & 1 \end{pmatrix} \quad (3)$$

The matrix elements r1-r9 and t1-t3 can describe a rotation or translation. Alternatively or additionally to a rotation, it is also possible for a deformation that is no solely the result of a projection, for example, shearing to be described in the elements r1-r9. The matrix elements p1-p3 describe the perspective projection on the basis of depiction in a cone beam. For a given arrangement of radiation source and detector, the matrix $M_i$ is a 4×3 matrix. If, for example, the central axis of the cone beam is directed along the y-axis and the detector lies in a plane perpendicular to the y-axis (x-z plane) and at a distance d from the center of the projection, the projection matrix $M_i$ can be depicted as $$M_i = \begin{pmatrix} r1_i & r2_i & r3_i & t1_i \\ r7_i & r8_i & r9_i & t3_i \\ 0 & 1/d & 0 & 1 \end{pmatrix} \quad (4)$$

Generally, the matrix elements of the projection matrix $M_i$ are defined such that $$v_{b,i} = M_i \cdot v_v \quad (5)$$

applies for the i-th set of image data. Here, $v_v = (x, y, z, w=1)^T$ is a column vector whose first three vector components represent the coordinates x, y and z of a voxel in 3D space. $v_b = (r, s, t)^T$ is a column vector from which the coordinates u and v of the pixel in the i-th image data, in which the voxel with the coordinate x, y and z is depicted, can be determined according to u=r/t and v=s/t. Vice versa, it is possible to determine for the different sets of image data from equations with the form of equation (5) how each voxel coordinate triple of the measuring chamber is expressed in pixel coordinate tupels of the sets of image data. At the corresponding pixel coordinates, the image data has a value which, on the reconstruction of the voxel with the corresponding voxel coordinate triple, enters the value thereof.

At 56, a modified projection parameter set is determined on the basis of the projection parameter set for the i-th image data and the corresponding positional data. Here, a modified projection parameter set can be determined from the projection parameter set assigned to the i-th set of image data and the position and/or orientation of the section of the examination object for the time of the data capture. The modified projection parameter set is determined such that the actual position and/or orientation of the section, which can be displaced relative to a reference position, is taken into account.

If deformations of the section of the examination object are negligible, parameters to use for the modification of the projection parameter set can be determined from a displacement and/or rotation of the section relative to a reference position and reference orientation determined at 54. To this end, a correction matrix $K_i$ for the i-th set of image data can be defined such that for at least one, advantageously for a plurality of points of the section $$v_{p,i} = K_i \cdot v_{p0,i} \quad (6)$$

is satisfied. Here, $v_{p,i} = (l, m, n, w)^T$ is a column vector from which the actual coordinates x, y and z of the point of the section in a laboratory system at the time of the capture of the image data according to x=l/w, y=m/w and z=n/w can be determined. $v_{p0,i}=(x0,y0,z0,w=1)^T$ is a column vector whose first three components x0, y0 and z0 are the coordinates of the point of the section when the section is located in its reference position.

The correction matrix $K_i$ is defined such that it represents the displacement and/or rotation of the section of the examination object relative to a reference position of the section. The correction matrix can generally have the form shown above in equation (2). If the section of the examination object only moves in a purely translatory way, $K_i$ can be depicted in homogeneous coordinates as $$K_i = \begin{pmatrix} 1 & 0 & 0 & x_i - x0 \\ 0 & 1 & 0 & y_i - x0 \\ 0 & 0 & 1 & z_i - z0 \\ 0 & 0 & 0 & 1 \end{pmatrix} \quad (7)$$

The modified projection parameter set can consist of the modified projection matrix determined from the matrix elements of equation (1) shown above $$\tilde{M}_i = M_i \cdot K_i.$$

The parameters of the modified projection parameter set determined in this way take into account the fact that, on the data capture for the i-th set of image data, the section of the examination object is displaced and/or rotated relative to a reference position of the section into other voxels of the measuring chamber.

At 57, the i-th image data are incorporated into the 3D volume data. For at least part of the voxels, the incorporation is performed on the basis of the modified projection parameter sets determined at 56. The reconstruction can be performed in different ways known from the prior art. For example, a filtered back projection or an iterative or algebraic reconstruction can be used. Examples of methods of this kind are in described in DE 198 58 306 A1 with further evidence. For example, for a voxel, the value of the pixel or pixels of the filtered image data in whose pixel coordinates the voxel coordinates of the voxel according to the modified projection matrix are depicted can be added to the current value of the voxel in the 3D volume data. In this way, a totaling of different pixel values is performed in the iterations through different sets of image data. As mentioned, the pixel coordinates of the sets of image data in which of the sets of image data was depicted is determined for at least a part of the voxels on the basis of the modified projection parameter sets.

At 58, a check is performed to see whether all sets of image data captured have now been captured. If this is not the case, the index i is incremented at 59 and the method is continued at 52 in order to capture the next set of image data and thereby to determine the position of the section of the examination object.

If it is determined at 58 that all sets of image data have been captured, the 3D volume data can be reproduced, output or graphically depicted at 60.

In one embodiment, at 57 it is possible to determine the pixel coordinates in which the voxel coordinates are depicted for all voxels of the 3D volume data on the basis of the modified projection parameter sets. This can, for example, be advantageous if the entire examination object is moved, for example by controlling the drive device 10 for the patient table 9 or on an inadvertent movement of the patient table 9. A reconstruction of all voxels on the basis of the modified projection parameter sets can also be advantageous in scenarios in which only one section of the examination object is moved relative to further sections of the examination object. This can have the result that the moving section of the examination object is reconstructed with higher definition than the further sections of the examination object.

In one embodiment, both a reconstruction on the basis of the projection parameters independent of the positional data and a reconstruction on the basis of the modified projection parameters can be performed. Both sets of 3D volume data can be output via an interface of the imaging apparatus 1 for further processing or displayed on a display device 20 of the imaging apparatus 1. Here, it is possible to make a user-defined choice between the data reconstructed on the basis of the projection parameters and the data reconstructed on the basis of the modified projection parameters.

In further embodiments, only a part of the voxels of the 3D volume data is reconstructed on the basis of the modified projection parameter sets, while a further part of the voxels is reconstructed on the basis of the projection parameter sets and independently of the positional data. This can be advantageous in order to display both the moved section, for example an organ, and also substantially unmoved sections of the examination object with a low degree of blurring. A corresponding method is described in more detail with reference to FIGS. 6 and 7.

FIG. 6 is a schematic representation of reconstructed 3D volume data. A partial volume 62 of the reconstructed volume 61 is selected such that it contains the moved section 63 of the examination object. The complementary partial volume 64 contains the voxels of the volume 61 which is not contained in the partial volume 62.

The partial volume 62 can be selected as a geometric shape, for example as a cuboid or ellipsoid whose center point and dimensions can be defined on the basis of the spatial area in which the moved section 63 of the examination object moves. This spatial area can be estimated on the basis of a plurality of sets of image data. Alternatively or additionally, a first reconstruction of 3D volume data can be performed on the basis of the projection parameter sets and independently of the positional data in order to define the partial volume 62.

Alternatively, the partial volume 62 can be defined by object segmentation. To this end, a first reconstruction of 3D volume data can be performed on the basis of the projection parameter sets and independently of the positional data. Segmentation of the 3D volume data obtained in this way enables the partial volume 62 in which the modified projection parameter sets are used on a subsequent repeat reconstruction to be determined. The segmentation can take place in such a way that an edge of the partial volume 62 corresponds to an edge of the moving section reconstructed in the first reconstruction.

FIG. 7 is a flow diagram of a method for 3D reconstruction according to a further exemplary embodiment. The method can be performed by the computation device 12 of the imaging apparatus 1.

In the method, initially a capture of image data and positional data can take place as described for steps 52-54 of the method 50.

At 71, a first reconstruction of the 3D volume data can be performed on the basis of the projection parameter sets and independently of the positional data. This step is optional. If step 71 is performed, the first 3D reconstruction can be performed parallel to the data capture, for example as described for steps 55-57 of the method 50. However, here an assignment of voxel coordinates and pixel coordinates is determined on the basis of the non-modified projection matrices. The captured sets of image data can be stored for the later repeat 3D reconstruction.

At 72, a part A of the voxels of the 3D volume data is identified to be reconstructed on the basis of the modified projection parameter sets. If, at 71, a first reconstruction of the 3D volume data was performed, the part of the voxels can be determined on the basis of the first reconstruction. To this end, 3D segmentation of the 3D volume data obtained in the first reconstruction can be performed.

At 73-81, the pixel coordinates in which the voxel coordinates of the voxel are depicted are identified for all sets of image data (iteration through i) and all voxels of the 3D volume data (iteration through j) in the different sets of image data. For elucidation, the 3D volume to be reconstructed can, for example, be divided into $512^3$ voxels. An index identifying a voxel is designated j in FIG. 7. While the voxels in FIG. 7 are schematically designated with one index, in practice three nested iterations can be used in order to reconstruct the voxels with specified coordinates of slices, rows and columns.

At 73, the iteration through the sets of image data is initialized. At 74, the iteration through voxels is initialized.

At 75, a check is performed to see whether the voxel j is contained in the partial volume A which is to be reconstructed on the basis of the modified projection parameter sets. If this is confirmed, at 76, the coordinates of the pixel or the pixels in the i-th set of image data in which the voxel coordinates of the voxel were depicted are identified. Hereby, the identification of the pixels is performed on the basis of the modified projection parameter set assigned to the i-th set of image data. The modified projection parameter set takes into account the actual position of the section of the examination object on the capture of the i-th set of image data.

If it is determined at 75 that the voxel j is not contained in the partial volume A, at 77, the coordinates of the pixel or the pixels in the i-th set of image data in which the voxel coordinates of the voxel were depicted are identified. Hereby, the identification of the pixels is performed on the basis of the projection parameter set assigned to the i-th set of image data and independently of the positional data. The determination of the coordinates of the pixel at 70 is performed independently of the positional data of the section of the examination object.

At 78, the i-th image data is incorporated into the 3D volume data. To this end, it is possible for example, for the voxel j, the value of the pixel or pixels of the filtered image data, in whose pixel coordinates the voxel coordinates of the voxel are depicted according to the modified projection matrix (step 76) or according to the projection matrix (step 77) to be added to the value of the voxel in the 3D volume data. In this way, in the iterations through different sets of image data, different pixel values are added to the value of the voxel j in the 3D volume data.

At 79, a check is performed to see whether the determination of pixels in the sets of image data has been performed for all voxels. If there are voxels, at 80, the next voxel j is selected and the method returns to 74.

If it is determined at 79 that all voxels of the 3D volume data have been processed, the method continues at 81.

At 81, a check is performed to see whether all sets of image data have been processed. If this is not the case, the index is incremented at 82 and the method returns to 73.

If it is determined at 81 that all sets of image data have been processed, at 83, the 3D volume data can be optionally reproduced and output via an electronic or optical interface. Additionally, output of the 3D volume data determined in the first 3D reconstruction at 71 can also be provided.

If in the method 70, at 71, a 3D reconstruction is performed on the basis of the projection parameter sets and independently of the motion data, voxels, which are not contained in part A of the voxels are not reconstructed again at 75-79. Instead, only the voxels j in the partial volume A to be reconstructed with motion correction can be determined according to the procedure explained in order to replace the voxels initially determined at 71 without motion correction.

With the method 70, a part of the volume to be reconstructed containing the moved section of the examination object can be reconstructed such that the actual position and/or orientation and/or deformation of the section is taken into account in the reconstruction.

The apparatuses and methods according to exemplary embodiments of the invention permit an image reconstruction with which the position and/or orientation of a moving section of the examination object can be taken into account in the actual reconstruction. This enables artifacts and blurring to be reduced. This makes it possible to move the examination object selectively in a laboratory system between the capture of different sets of image data. The effects resulting from the change of position and/or orientation can to a large extent be compensated by the reconstruction according to apparatuses and methods described here.

In one embodiment, the examination object is moved such that, for at least some of the sets of image data, the size of a detector surface on which the radiation lands following propagation through the examination object is enlarged or diminished. With the imaging apparatus 1 in FIG. 1, this can be achieved by controlling the drive device 10 for the patient table 9. The patient can be moved on the basis of the position of the X-ray source 4 and the X-ray detector 5. For example, in a position, in which a middle beam of the cone beam substantially extends horizontally, that is the C-arm 3 is pivoted by 90° relative to position depicted with continuous lines in FIG. 1, the patient table 9 can be moved such that a center line of the patient table 9 is located closer to the X-ray source than is the case with the position of the C-arm 3 depicted in FIG. 1 with continuous lines. In this way, for this position of X-ray source 4 and X-ray detector 5, the number of pixels that capture significant data for the reconstruction is increased.

In a further embodiment, the examination object can be moved such that a larger volume of the examination object can be reconstructed from the captured image data.

While exemplary embodiments were described in detail with reference to the figures, modifications of these exemplary embodiments can be implemented with further embodiments. While, with some of the exemplary embodiments described, a measuring device is provided in order to determine the position and/or orientation of a section of the examination object as a function of time, with further embodiments this information can be alternatively or additionally be determined from the image data by means of computation. In particular, if a region of the section, such as for example a vascular bifurcation, an implant, stent or clip, leads to a unambiguous signature in the image data, the position and a change in the position of the section can be estimated from a few sets of image data.

While for the determination of a translatory movement of the section of the examination object, monitoring of a single point of the section, which is, for example, defined by an anatomical marker or a non-anatomical element, is sufficient for the determination of the positional data, in further embodiments, the positions of a plurality points of the section as a function of time can be captured in order to take into account rotation and/or deformation of the section in the reconstruction of the 3D volume data. A rotation can also be captured by a suitably designed measuring probe comprising, for example, two non-collinear coils.

While methods and procedures according to exemplary embodiments were described as the result of steps, modifications of the methods and procedures can be implemented. For example, while elements or devices of the imaging apparatus 1 are depicted to explain their function as separate blocks, a plurality of these units can be integrated. For example, a processor or a group of processors can execute the functions of the computation device 12, the control unit 14 and the computer 16.

While exemplary embodiments have been described in detail in which the movement of a section of the examination object is captured and a corresponding motion correction is performed in the reconstruction, the apparatuses and methods can also be used correspondingly for motion correction of a plurality of independent movements. To this end, a position and/or orientation relative to a reference position of the respective section as a function of time are captured for each of the moving sections. As described above, modified projection parameter sets can be determined for each of the sections. The 3D volume data can be reconstructed in sections, wherein different modified projection parameter sets taking into account the different movements of the sections are used for different parts of the volume.

While exemplary embodiments were described in the context of C-arm devices, apparatuses and methods according to embodiments of the invention can also be used with other devices with which 2D or 1D image data are captured and 3D volume data are reconstructed therefrom.

Exemplary embodiments of the invention permit the reduction of motion artifacts in the reconstruction of 3D volume data. Fields of application include, for example, medicinal imaging.

1 List of reference numbers

|   |       |                                        |
|---|-------|----------------------------------------|
| 2 | 1     | Imaging apparatus                      |
| 3 | 2     | C-arm device                           |
| 4 | 3     | C-arm                                  |
| 5 | 3'    | C-arm in another position              |
| 6 | 4     | X-ray source                           |
| 7 | 5     | X-ray detector                         |
| 8 | 6     | Cone beam                              |
| 9 | 6'    | Further cone beam                      |
| 10 | 7    | C-arm drive                            |
| 11 | 8    | Movement of the C-arm                  |
| 12 | 9    | Patient table                          |
| 13 | 10   | Patient table drive                    |
| 14 | 11   | Evaluation and control unit            |
| 15 | 12   | Computation device                     |
| 16 | 13   | Memory unit                            |
| 17 | 14   | Control unit                           |
| 18 | 15   | Measuring device                       |
| 19 | 16   | Measuring device computer              |
| 20 | 17-19 | Device for generating a magnetic field |
| 21 | 20   | Display device                         |
| 22 | 21   | Microsensor                            |
| 23 | 22   | Interface                              |
| 24 | 23, 24 | Microsensors                          |
| 25 | P    | Examination object                     |
| 26 | 30, 30' | Section of the examination object    |
| 27 | 31   | First position of a point of the section |
| 28 | 32   | Second position of the point of the section |
| 29 | 40   | Organ                                  |
| 30 | 41   | First position of a point of the organ |
| 31 | 42   | Second position of the point of the organ |
| 32 | 43   | Vessel                                 |
| 33 | 44   | Element for determining the position   |
| 1  | 45   | Displacement                           |

-continued

1 List of reference numbers

|   |       |                            |
|---|-------|----------------------------|
| 2 | 50    | Method                     |
| 3 | 51-60 | Method steps               |
| 4 | 61    | Volume                     |
| 5 | 62    | Part of the volume         |
| 6 | 63    | Reconstructed section      |
| 7 | 64    | Further part of the volume |
| 8 | 70    | Method                     |
| 9 | 71-83 | Method steps               |

The invention claimed is:

1. A method of determining 3D volume data of an examination object from a plurality of sets of 1D or 2D image data of the examination object, the method comprising:
with a detector, acquiring the plurality of sets of 1D or 2D image data;
with a measuring device, determining positional data for at least one moving section of the examination object indicating a position and/or an orientation of the at least one moving section of the examination object for a plurality of capture times for the image data; and
with a computation device, reconstructing the 3D volume data from the plurality of sets of image data based on the positional data indicating the position and/or the orientation of the at least one moving section and based on a plurality of projection parameter sets, wherein each projection parameter set is assigned to a set of image data and indicates pixel coordinates of the set of image data in which voxel coordinates of voxels of a measuring chamber are depicted.

2. The method according to claim 1, which comprises determining a plurality of modified projection parameter sets on the basis of the plurality of projection parameter sets and the positional data, and performing the reconstruction of the 3D volume data on the basis of the modified projection parameter sets.

3. The method according to claim 2, wherein for at least one set of image data or for each set of image data, the modified projection parameter set indicates the pixels of the set of image data in which voxels of the at least one section of the examination object are depicted.

4. The method according to claim 2, wherein for at least one set of image data or for each set of image data, the projection parameters represent matrix elements of a projection matrix and the method further comprises, in order to determine the modified projection parameter set assigned to the set of image data, determining matrix elements of a matrix product of the projection matrix and a further matrix defining a displacement and/or rotation and/or deformation of the at least one section of the examination object relative to a reference position.

5. The method according to claim 2, which comprises reconstructing all voxels of the 3D volume data on the basis of the modified projection parameter sets.

6. The method according to claim 2, which comprises reconstructing only a portion of the voxels of the 3D volume data on the basis of the modified projection parameter sets.

7. The method according to claim 6, which comprises determining the portion of the voxels on the basis of a position of the section of the examination object.

8. The method according to claim 6, which comprises performing a first reconstruction of the 3D volume data on the basis of the plurality of projection parameter sets and determining the portion of the voxels on the basis of an object segmentation of the 3D volume data determined in the first reconstruction.

9. The method according to claim 6, which comprises reconstructing a further portion of the voxels of the 3D volume data on the basis of the plurality of projection parameter sets and independently of the positional data.

10. The method according to claim 1, which comprises capturing the positional data with the measuring device using electromagnetic, optical or acoustic signals.

11. The method according to claim 10, wherein the signals are electromagnetic, optical or acoustic waves.

12. The method according to claim 1, which comprises capturing with the measuring device a position of at least one anatomical marker on the at least one section of the examination object as a function of time in order to determine the positional data.

13. The method according to claim 1, which comprises capturing with the measuring device a position of at least one non-anatomical element in or on the section of the examination object as a function of time in order to determine the positional data.

14. The method according to claim 1, which comprises determining the positional data computationally on the basis of the image data.

15. The method according to claim 1, which comprises moving the examination object relative to a laboratory system between the capture of at least two sets of image data.

16. The method according to claim 15, which comprises moving the capture device for capturing the plurality of sets of image data between a plurality of positions in the laboratory system and moving the examination object on a basis of the position of the capture device.

17. The method according to claim 1, which comprises capturing the image data with an X-ray planar detector.

18. A computer program, comprising a sequence of computer executable commands stored in non-transitory form and being configured, when executed by an electronic computation device of an imaging apparatus, to cause the imaging apparatus to perform the method according to claim 1.

19. An imaging apparatus, comprising:
a capture device for capturing a plurality of sets of 1D or 2D image data of an examination object;
a memory unit for storing a plurality of projection parameter sets, wherein each projection parameter set is assigned to a set of image data and indicates respective pixel coordinates of the set of image data in which voxel coordinates of voxels of a measuring chamber are depicted; and
a computation device connected to said capture device and to said memory unit and configured to reconstruct 3D volume data from the plurality of sets of image data on a basis of the plurality of projection parameter sets, wherein said computation device is configured to perform a reconstruction of the 3D volume data further on the basis of positional data indicating a position and/or an orientation at least of one moving section of the examination object for a plurality of capture times for the image data.

20. The imaging apparatus according to claim 19, wherein the computational device is configured to carry out the steps of the method according to claim 1.

21. The imaging apparatus according to claim 19, further comprising: a measuring device configured to provide the positional data indicating the position and/or the orientation at least of one moving section of the examination object for the plurality of capture times for the image data.

* * * * *